(12) United States Patent  
Liu et al.

(10) Patent No.: US 6,502,755 B2
(45) Date of Patent: *Jan. 7, 2003

(54) OPTICAL DATA STORAGE CARD

(75) Inventors: Jeffrey F. Liu; Francis K. King, both of San Jose, CA (US)

(73) Assignee: DCARD, Inc., Milpitas, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,447

(22) Filed: Apr. 9, 1999

(65) Prior Publication Data

US 2002/0014534 A1 Feb. 7, 2002

Related U.S. Application Data

(60) Provisional application No. 60/081,257, filed on Apr. 9, 1998.

(51) Int. Cl.[7] .............................................. G06K 19/00
(52) U.S. Cl. ...................... 235/489; 235/454; 235/494; 369/16
(58) Field of Search .................... 235/487, 494, 235/454, 493, 495, 486, 476; 369/13, 16, 44.26

(56) References Cited

U.S. PATENT DOCUMENTS

| 3,612,834 | A | * | 10/1971 | Arikawa | 235/493 |
| 4,014,604 | A | * | 3/1977 | Schwartz | 353/120 |
| 4,321,700 | A | * | 3/1982 | Russell | 350/6.7 |
| 4,592,042 | A | * | 5/1986 | Lemelson et al. | 369/258 |
| 4,779,145 | A | * | 10/1988 | Lemelson | 360/2 |
| 5,045,676 | A | * | 9/1991 | Kime | 235/487 |
| 5,059,774 | A | * | 10/1991 | Kubo et al. | 235/454 |
| 5,107,099 | A | * | 4/1992 | Smith | 235/449 |
| 5,461,220 | A | * | 10/1995 | Ogino | |
| 5,497,367 | A | * | 3/1996 | Yamagami et al. | 369/275.2 |
| 5,526,328 | A | * | 6/1996 | Oshima et al. | 369/13 |
| 5,894,460 | A | * | 4/1999 | Yanagawa et al. | 369/13 |
| 5,942,744 | A | * | 8/1999 | Kamo et al. | 235/493 |

FOREIGN PATENT DOCUMENTS

| JP | 61-190721 | * | 8/1986 |
| JP | 62-264458 | * | 11/1987 |
| JP | 63-119082 | * | 5/1988 |
| JP | 02-240843 | * | 9/1990 |
| JP | 02-249181 | * | 10/1990 |
| JP | 04-363778 | * | 12/1992 |

* cited by examiner

Primary Examiner—Karl D. Frech
Assistant Examiner—Diane I. Lee
(74) Attorney, Agent, or Firm—Bo-In Lin

(57) ABSTRACT

The optical data-storage card includes an optical data-storage medium layer supported on the card. The data-storage medium layer includes a plurality of data storage tracks for storing data therein. Each of the tracks having at least an arc-segment wherein each of the data storage tracks being substantially parallel to a neighboring track.

40 Claims, 10 Drawing Sheets

OPTICAL DATA STORAGE CARD

This application is a Continuation-in-Part (CIP) Formal Application claims a Priority Date of Apr. 9, 1998, benefited from a previously filed Provisional Application 60/081,257 by the same Applicants of this application.

BACKGROUND OF THE INVENTION

1. Field of the Invention

This invention relates generally to systems and method for reading data from and writing data to data storage medium by employing the optical recording technology. More particularly, this invention is related to an improved optical data access system. The data access system is implemented in a portable data card drive device and in a high speed subsystem for reading data from and writing data to an optical data card which has a novel data track configuration for storing data with uniform density. Data can be stored for user applications or related to application system configurations.

2. Description of the Prior Art

Conventional technology of reading-writing data on concentric circular data tracks often presents a problem that the data-bit density varies between the outer tracks and the inner tracks. The variable bit density in data storage is due to a geometrical factor that the outer data tracks are much longer in length than the inner tracks. A common practice is to form the inner tracks with a capacity to store the data bit at a higher bit density. A more complicated servo control system implemented with more complex signal-processing algorithms is required due to the variations of data storage density between different data tracks. Additionally, by varying the data storage density from the inner tracks toward the outside tracks, the data transfer rate is also changed in accessing data from the inner tracks then outside tracks. Such variation may also cause difficulties and complications in processing the data. Higher error rates may incur due to these variations between the inner tracks and the outer tracks.

Therefore, a need still exists for an improved data-card drive system to overcome the aforementioned difficulties encountered in the prior art. Specifically, this storage card drive system must provide a uniform density for data storage and a data-card drive system to assess the data-storage card. Furthermore, it would be desirable that this system is portable and is also provided with several standardized sized for processing-standardized data-storage cards.

SUMMARY OF THE PRESENT INVENTION

Therefore, an object of the present invention is to provide a data storage-card drive system which a pickup head moving above the data-storage card in rotational movement. The data read-write functions are enabled only for arc-segments of the rotational movement such that the data tracks are arranged as plurality of parallel arcs, e.g., half-circles, to overcome the aforementioned difficulties and limitations encountered in the prior art.

Specifically, it is an object of the present invention to provide a data-storage card drive system with a pickup head driven by a motor, e.g., a brushless motor, to rotate over the data-storage card with the rotation axis perpendicular to the card surface. The motor is mounted on a carriage for making horizontal movement along a longitudinal direction of the data card. The position of the pickup head is then servo-controlled by moving the carriage and the motor while the data storage card either stays at a fixed position or only pickup head is rotating and the card is making horizontal linear movements.

Another object of the present invention is to provide a data-storage card drive system for performing the data access tasks over a data storage medium surface, which has uniform data storage density. A new configuration of data-tracks formed as parallel arc or arc-segments, e.g., semi-circular data track, is implemented such that all data tracks have substantially the same length for data storage and the data bits are stored with uniform density.

Another object of the present invention is to provide a data-storage card drive device implemented with a subsystem provided with local memory storage for conveniently interface with personal computers or peripheral devices to achieve higher speed operations.

Briefly, in a preferred embodiment, the present invention includes an optical data-card. The optical data-storage card includes an optical data-storage medium layer supported on the card. The data-storage medium layer includes a plurality of data storage tracks for storing data therein. Each of the tracks comprising at least an arc-segment wherein each of the data storage tracks being substantially parallel to a neighboring track. The data storage of the data card may contain user application and system configuration data. The recorded data can be updated in the field. Application system can either encrypt or decrypt the recorded data. Application system can also change the configuration such as set and reset the write protection, the password and other features related to the data-access operations.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1A:
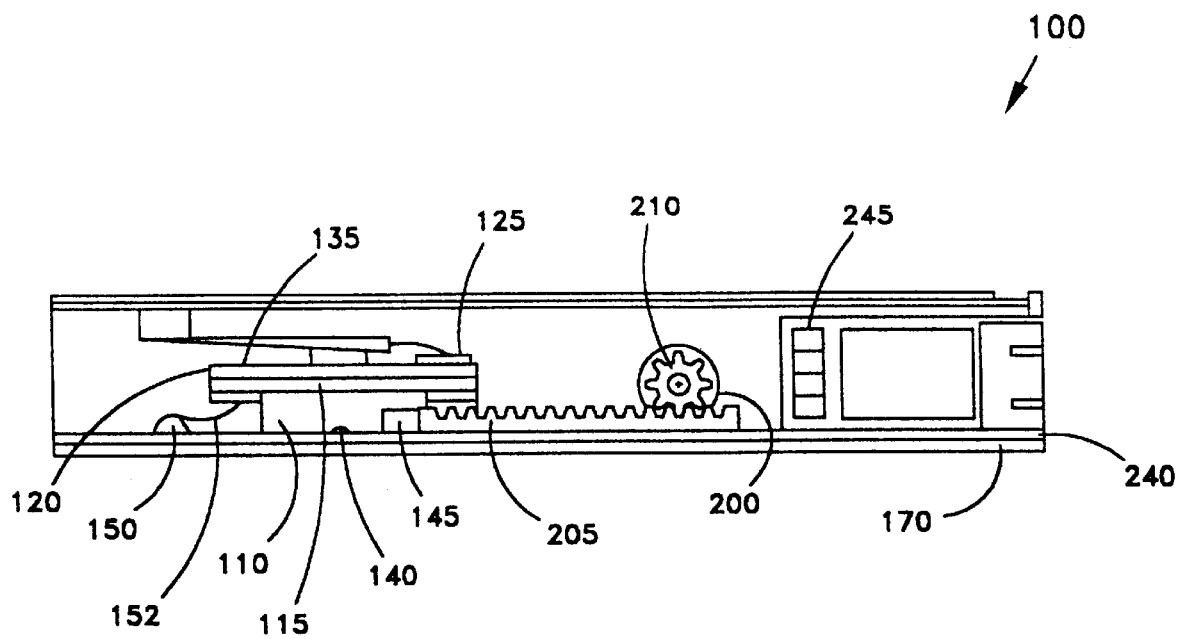
FIGS. 1A and 1B shows a cross sectional view and a top view respectively of a data card drive system of this invention.
Figure 1B:
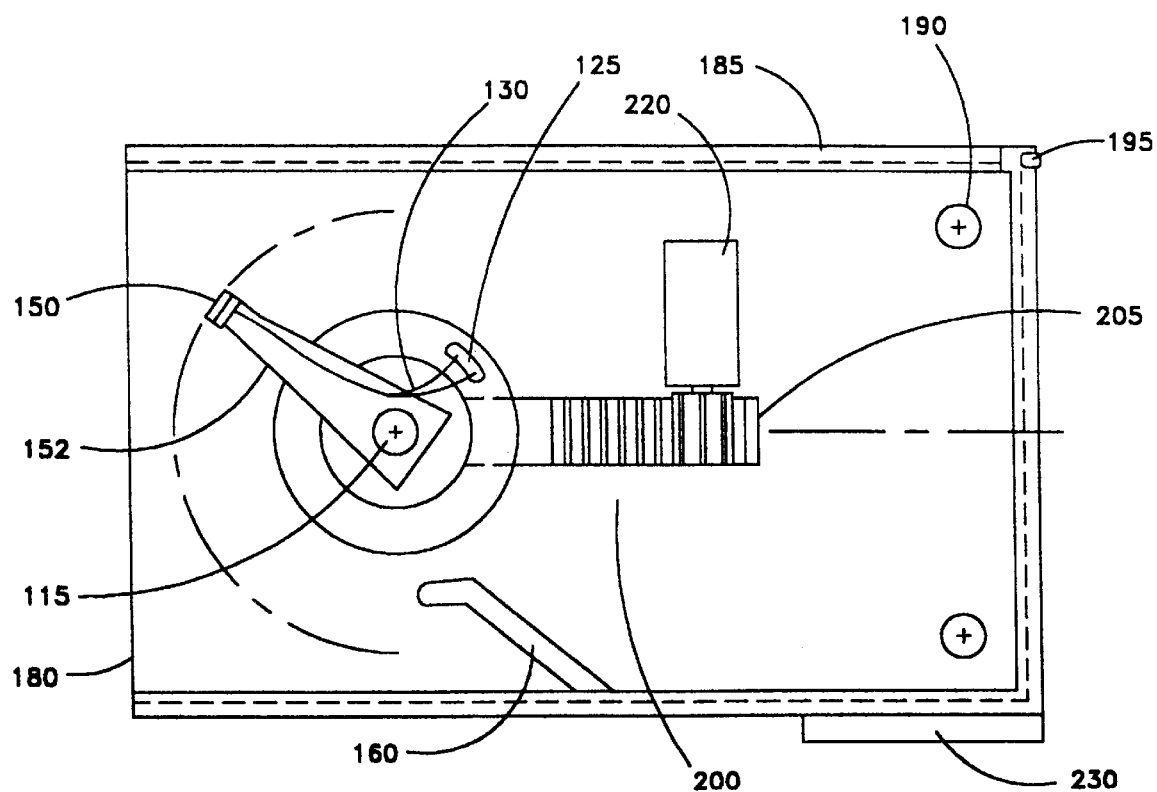

FIGS. 1A and 1B show the cross sectional view and the top view of a data-card drive 100 of the present invention.

The data-card drive 100 can be configured for reading and writing data-cards of different sizes, e.g., a PCMCIA type card or common credit card size. The data-card drive 100 includes a motor 110, e.g., a DC brushless motor. The motor 110 is provided to operate at a low speed to conserve battery power, at high speeds to achieve fast data access time. The motor 110 further is further provided to functions at two different modes, i.e., an sleep mode when not being deployed and a wake up mode for normal data access operations. The brushless motor is mounted on a carriage 115 with a pickup head assembly mounted to the motor rotating shaft assembly. Half of an data-signal transformer, which can either being a ring type, a round-disk type, or other geometrical shapes, is mounted onto the motor rotating shaft assembly, the other half of the data-signal transformer 120 of similar configuration is mounted to the fixed part of motor assembly. Signal wires 130 form head are soldered onto the rotating half of the transformer 120 with the soldering pad 125, that can also be a spring pressed connection, for transmitting the read/write signals via the data-signal transformer 120. The data-signal transformer 120 and the soldering pad 125 are covered by an optical flux shield plate 135 for shielding the data-signal flux generated by the data-signal transformer to prevent DC erase of data. A ground spring 140 is applied to perform the function of dissipating electric static discharged. Optionally, a brake-magnet 145 is provided to fix the "parking" position of the brushless motor in the sleep or power off mode during the time when there is no data access activities.

A read/write head 150 is mounted via an extended head-arm 152 to the brushless motor 110 via a head-arm mounting assembly mounting holes 155 to the head carriage 115. A head loading/unloading arm 160 is mounted on the base-plate 170. The loading/unloading arm 160 presses to the head-arm 152 at the unload position at a drive-device power-off mode. The loading/unloading arm 160 is removed from the head-arm 152 when a data card 180 is loaded and the power for the drive device is turned on.

In order to assist a smooth loading of the data card 180 into the drive device 100, a card guide plate 185 is provided. The data-card drive system 100 further includes one or several data card pins 190 to engage and fix the position of the data card 180 when the data card 180 reaches a designated operational position. The data card pins 190 increases the compatibility and interchangeability of different types of data cards for data access operations using this data card drive system 100. The drive system 100 further includes an on/off switch 195, which is turned on when the data card 180 reaches its final position.

Figure 1C:
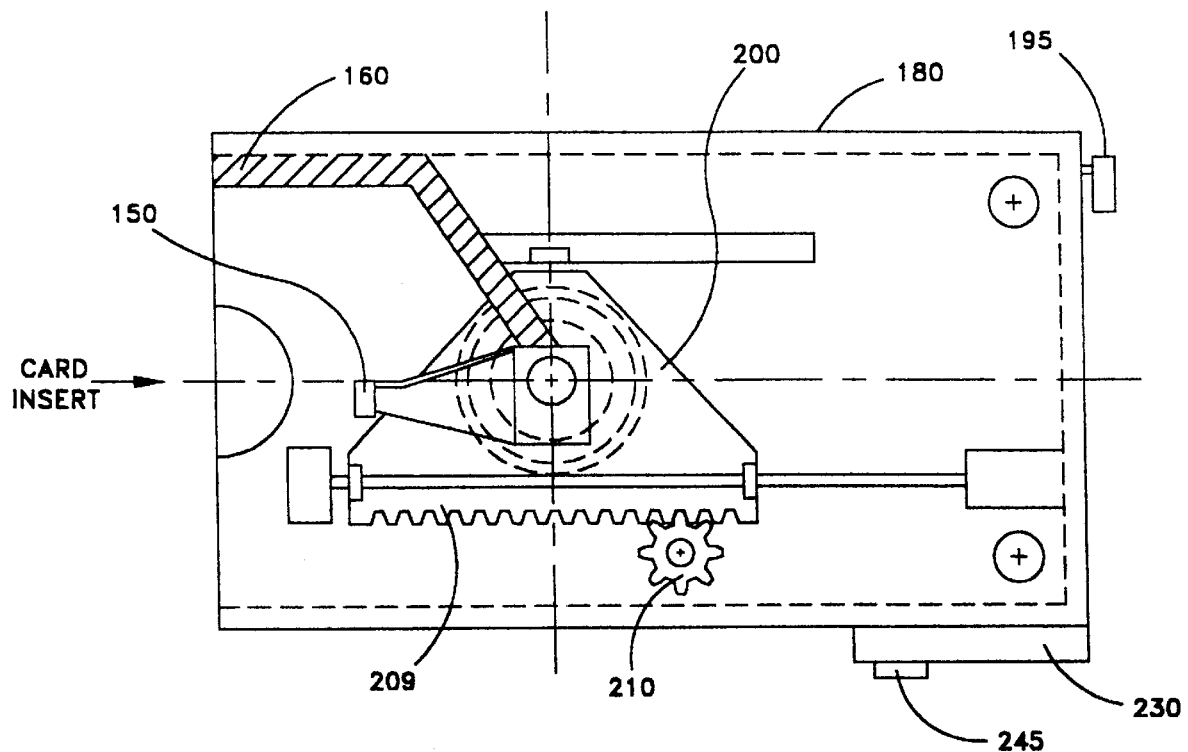
FIG. 1C is cross sectional view for showing the details of the motor rack mounting and the head loading/unloading assembly.
Figure 1D:
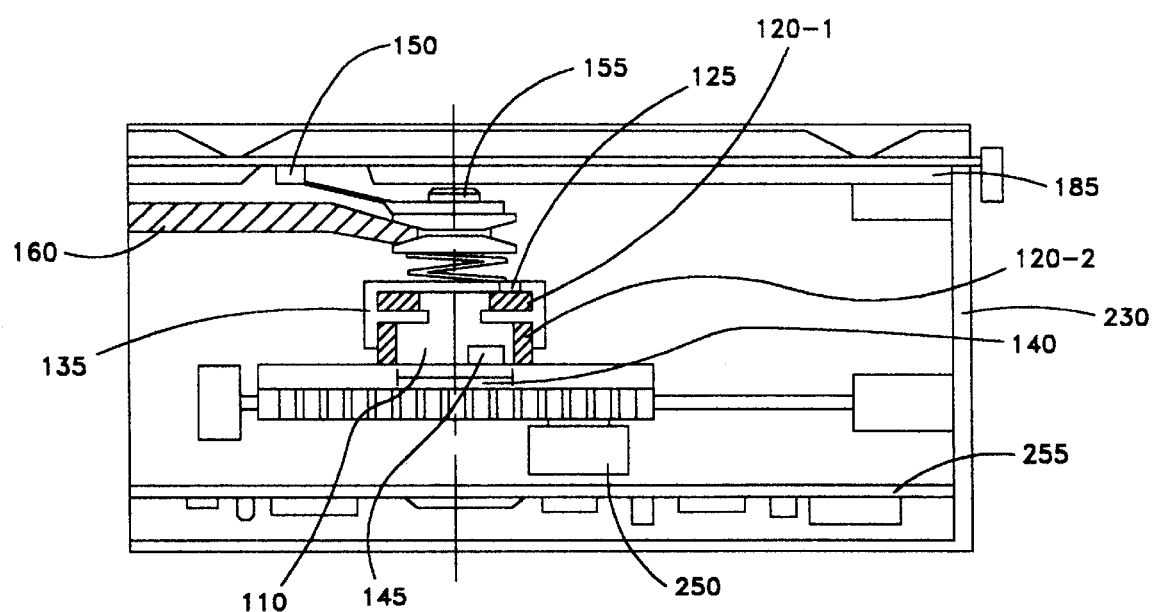
FIG. 1D shows a perspective view of the pickup head and the wires winding configuration serving as read/write data signal transformer.

The brushless motor 110 is mounted onto a motor-rack mount 200 with a rack 205 and a pinion 210. A step motor 220 is employed to control the movement of the brushless motor 110 or the move the data card 180. The drive device 100 further includes a LCD display 230 to indicate the track position of the head 150 in reading or writing of data onto the data card 180. Mounted on the base plate 170 is a printed circuit board 240, which supports a track locator switch 245. The printed circuit board 240 further supports various kinds of circuits for performing the functions of control and data access. These circuits includes head tracking circuit, head loading/unloading circuits, disable/enable read-write function circuit, servo control integrated circuit (IC), motor control IC, data separator IC, ADI interface IC, USB interface IC, PCMCIA interface IC, USB connector, PCMCIA connector, and other circuits required for controlling and operating the data card drive system. FIG. 1C is a cross sectional view for showing the details of the rack 205, the pinion 210, and the head loading and unloading assembly 160 to lift the head when the drive device 100 is turned off. A head arm lifter 103 has a wire type hook 103A positioned above the pickup head arm 130. The sliding of the head arm lifter 103 with the wire type hook 103A along the motor shaft assembly can lift or lower the pickup head arm 130 and in turn lift or lower the pickup head 150. The pickup head arm 130 is rotating with the motor shaft and the pickup head 130. Regardless of where the pickup head 150 when the rotational movement stops, the arm 160 can always engage into the head lifter 103 slot and sliding the head lifter 103 along the motor shaft.

The drive device 100 as described above is also provided with an option to perform the functions of a servo writer. A novel servo writer is disclosed in this invention which can be manufactured with simplified manufacturing processes. The servo writer includes a storage card loading assembly that is structured similarly to a card guide 185 of the device 100. The storage card can be inserted horizontally inserted for direct contact with the pickup head 150. Or, depending on specific application, the data storage card can be inserted from a vertical slot opening and then flip over for contact with the pickup head. In writing the servo data, the pickup head 150 is rotating along different data tracks. The pickup head is moved to different tracks during the operation of writing servo data by either moving the head/motor assembly mounted on the shaft or by keeping the head/motor assembly stationary while horizontally moving the data storage card. The data-signal transformer is employed in writing the servo data onto different data tracks where the cables are arranged without being twisted when the pickup head is making rotational movement.

According to FIGS. 1A to 1D and above descriptions, the present invention discloses a data-card drive system 100, which includes a data access means provided for performing a rotational movement for accessing data over an arc-segment or arc-segments of the rotational movement. In a preferred embodiment, the data access means is provided for accessing data over substantially one-half of the rotational movement. In a preferred embodiment, the data access means includes a pickup head 150 and a motor 110 for driving the pickup head 150 for performing the rotational movement. In another preferred embodiment, the data access means further included a data signal transformer 120 for transforming a data signal related to accessing data by the pickup head 150. In another preferred embodiment, the data-card drive system further includes a movable carriage 115 with the motor mounted thereon for carrying out a horizontal linear movement. In another preferred embodiment, the motor 110 is mounted at a fixed position on the movable carriage 115. In another preferred embodiment, the data-card drive system 100 further includes a servo control for controlling the movable carriage 115 and the motor 110.

Figure 1E:
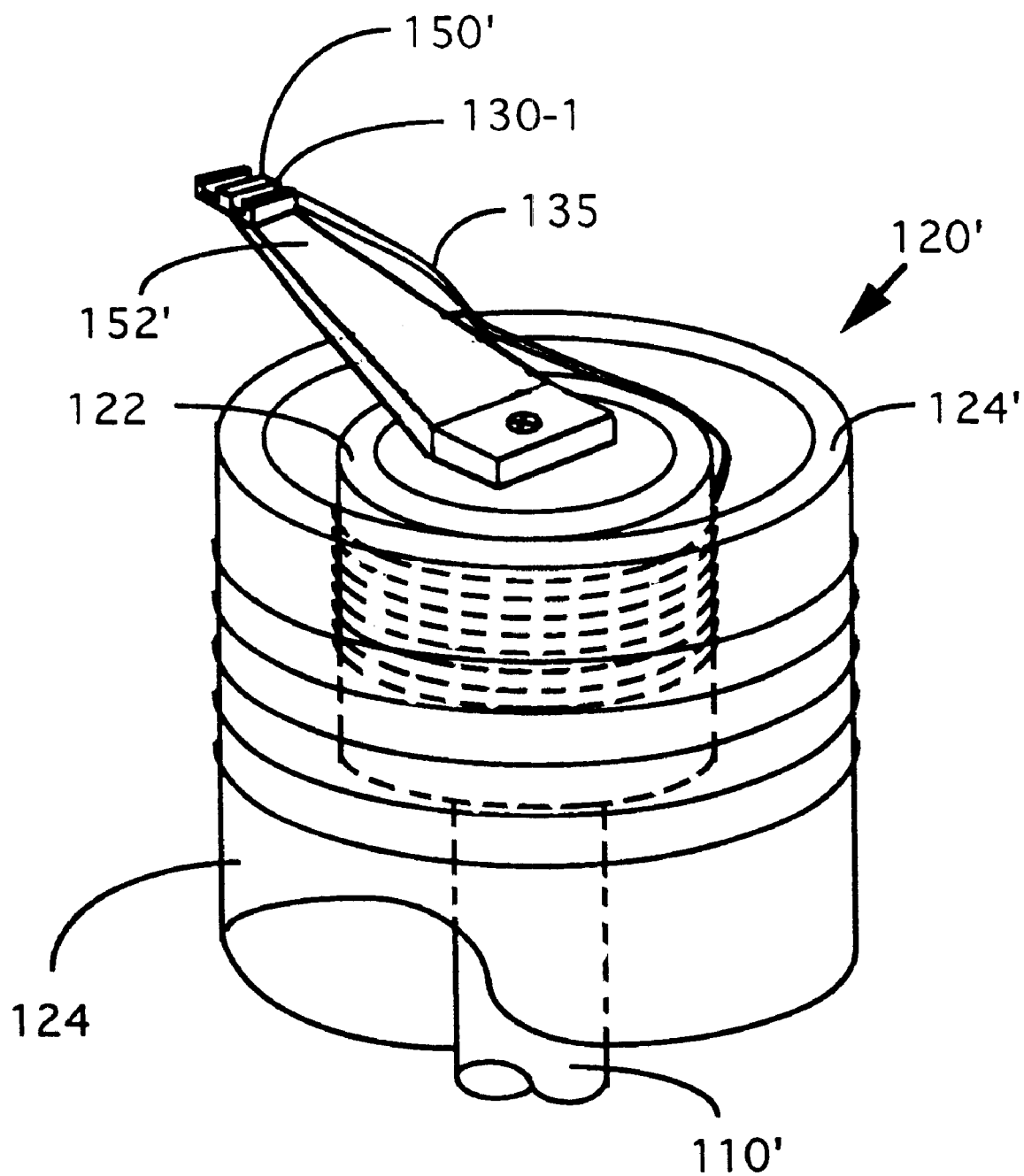
FIG. 1E is a perspective view of a data signal transformer of this invention.

FIG. 1E is a perspective view of an alternate configuration of a data signal transformer 120'. The data signal wires 130-1 connected to the pickup head 150' supported on the arm 152' for the pickup head 150' are first winding around an inner signal transforming cylinder 122, which rotates with the rotation shaft or the motor 110. A stationary hollow pipe 124 is placed around the inner signal-transforming cylinder 122. A set of signal transforming wires wrap around this stationary hollow pipe 124. For read/write data, an electric signal representing a binary bit can be transferred from a pickup head 150 through the wires 135 to the wires wrapping around the inner signal-transforming cylinder 122. The electric signals, typically an electric pulse, transferred to the wires around the inner cylinder 122 can be detected with variations of electromagnetic field by a set of wires wrapping around the stationary hollow pipe 124. Similarly, the data signal for the pickup head 150' can also be provided to the wires wrapping around the stationary hollow pipe 124 as electric pulses and detected by the wires wrapping around the inner signal transforming cylinder 122 for transfer to the pickup head 150'. The wires around the inner and outer cylinder pipes function as inductive coils serving the function of data signal transformation.

Figure 2A:
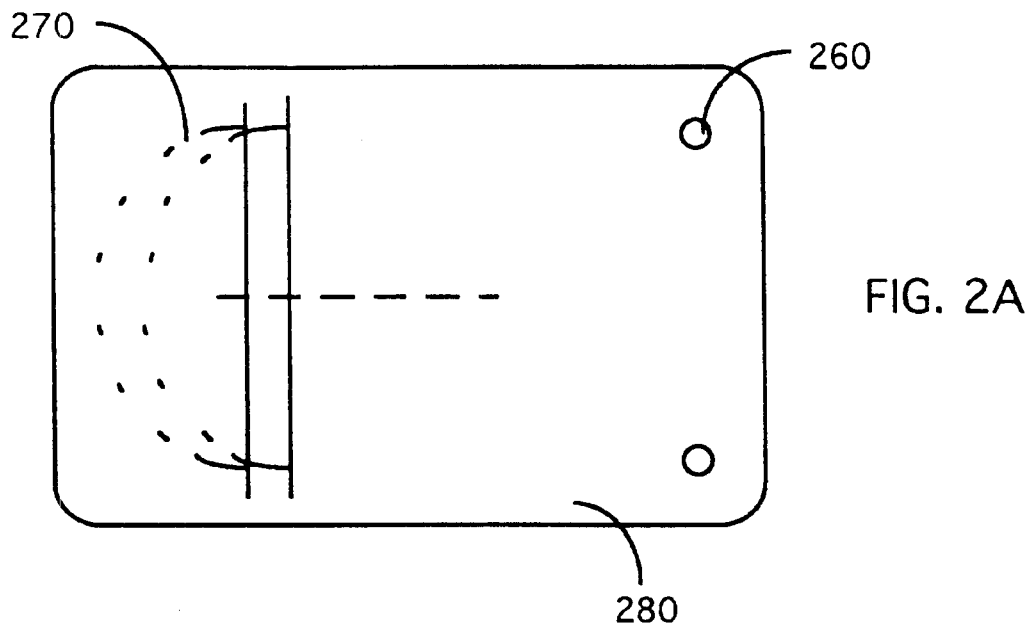
FIGS. 2A to 2C are respectively a top view, a cross sectional view and a bottom view of a data storage card with data tracks formed for storing bits with uniform density in each of these data tracks.
Figure 2B:
Figure 2C:
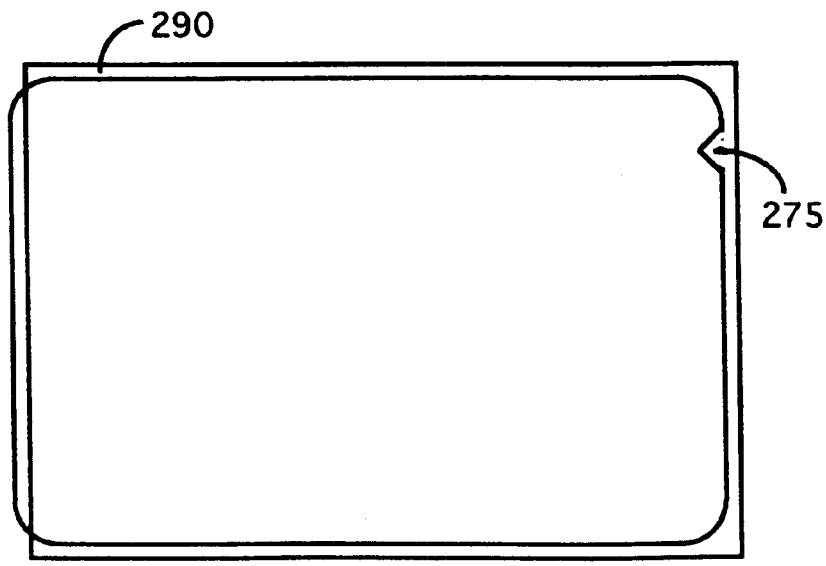

FIGS. 2A to 2C are respectively a top view, a cross sectional view, and a bottom view of a data card 180 of the present invention. The data card 180 is formed on a substrate plate 250. The substrate-plate 250 for optical recording is composed of non-magnetizable materials with a flat surface, e.g., a plastic or glass substrate plate. For optical recording, a magnetizable material can also be employed to form the substrate plate 250. The substrate plate 250 is then coated with a thin layer of recording medium on one side or both sides. For optical recording, the coating are formed by optical sensitive particles coated on one-side or both sides of the substrate plate 250. The optical sensitive coating can be directly on the surface of the substrate plate 250 or on a Mylar type of material with adhesive layer for attaching to the substrate plate 250. For optical recording the recording medium layer can be formed by a process similar to that of an optical compact-disk (CD), CDR, LD, or digital video display (DVD) disks. The data card 180 can be formed with standardized sizes, e.g., PCMCIA standard sizes or standard credit card sizes, and has round or elongated holes 260 for fixing the card at pre-designated positions to initialize a data access operation. The holes 260 are fitted to the pins 190 to provide the self-centering and locking functions. The data storage card 280 can therefore be repeatedly placed at a pre-designated position with reliable accuracy. The data card 180 is provided with a plurality of data tracks 270 for storing data bit on each track. Each of these data tracks is formed as substantially an arc or arc-segments track. The data tracks 270 are substantially of a same length and are substantially parallel to each other. The data tracks 270 are formatted to include multiple sectors. One or several of these sectors can be flexibly employed to provide servo data for the purpose of identifying track locations to enhance sector seeking during a data-access operation. The servo-data are provided in sectors near both ends of the arc or arc-segments data tracks 270 as shown in FIG. 2A. For the purpose of more precisely positioning the data card 180 in a drive device, a notch 275 is formed near the inner end of the data card 180. With the notch 275, the data card 180 is more conveniently placed into the drive device fitted to the initial card position ready for operation relative to the position of the pickup head 150. The data card 180 is then covered by a protective coating 280 preventing damages from exposure to water, dust and other foreign particles introduced through the daily operational environment. The data card 180 is then stored in a data card envelop 290 for storage and shipment. The data card 250 can be manufactured as single layer, multiple layers and maybe formed with different kinds of recording medium layer or layers and based layers. The techniques, layer structures and method of manufacture disclosed in prior art Patents of U.S. Pat. Nos. 3,644,716, 5,110,707, and 5,582,910 are incorporated by reference as parts of the disclosures for this patent application.

Figure 2D:
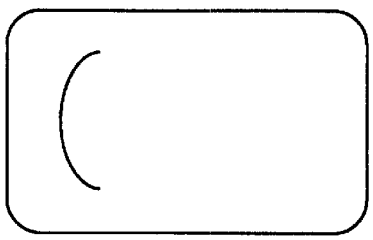
FIGS. 2D to 2Q show the top views of the data storage card of this invention where the data tracks can be arranged in arc-segments of different shapes, sizes, and facing different directions.
Figure 2E:
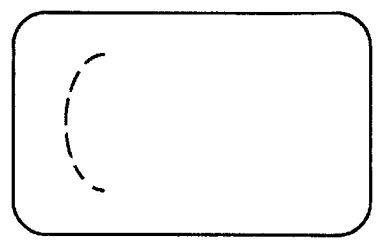
Figure 2F:
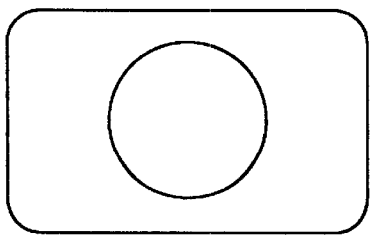
Figure 2G:
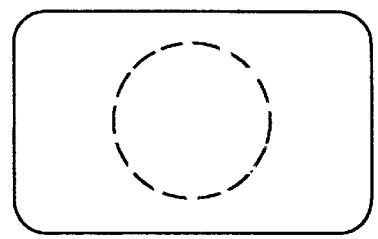
Figure 2H:
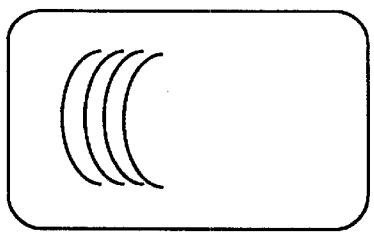
Figure 2I:
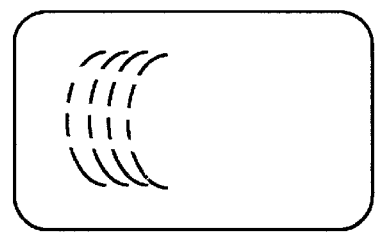
Figure 2J:
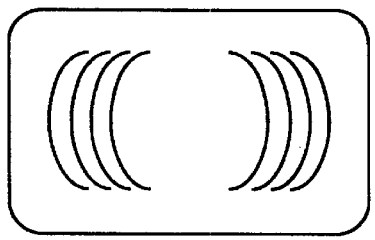
Figure 2K:
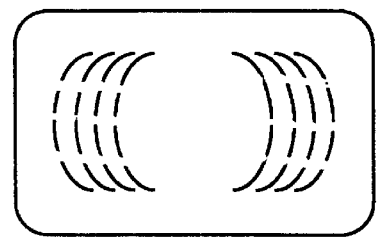
Figure 2L:
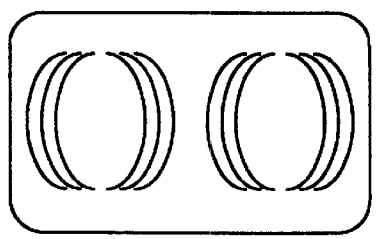
Figure 2M:
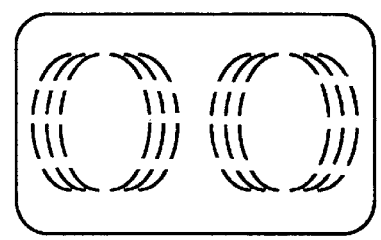
Figure 2N:
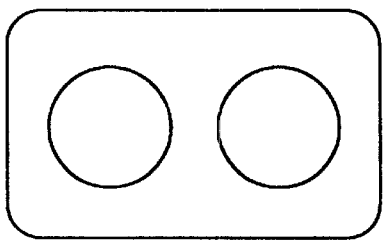
Figure 2O:
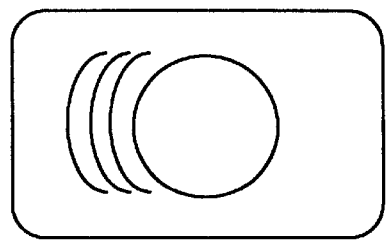
Figure 2P:
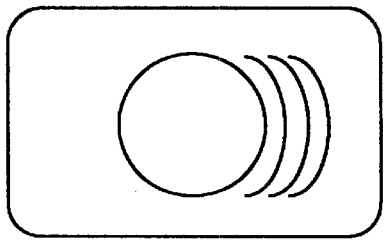
Figure 2Q:
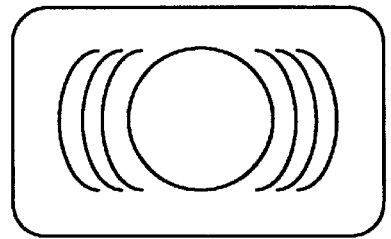

FIGS. 2D to 2Q are top views of the data storage card 180 for showing different configuration of the data tracks 270. The data tracks 270-1 can be parallel arcs facing opposite directions on either side of the data card 180 as shown in FIG. 2D. Alternately, each of the data tracks 270-1 as parallel arc as that shown in FIG. 2D, can be partitioned into a plurality of arc-segment 270-2 as that shown in FIG. 2E. In a similar manner, the data tracks can be parallel arcs 270-3 formed over the entire data card area as that shown in FIG. 2F. Furthermore, each of the parallel arcs 270-3 of FIG. 2F, can also be partitioned into a plurality of arc segments 270-4 as that shown in FIG. 2G.

According to FIGS. 1 to 2, this invention discloses an optical data-storage card. The optical data-storage card includes an optical data-storage medium layer supported on the card. The data-storage medium layer includes a plurality of data storage tracks for storing data therein. Each of the tracks comprising at least an arc-segment wherein each of the data storage track being substantially parallel to a neighboring track. In a preferred embodiment, each of the arc-segments are substantially of a same segment length. In a preferred embodiment, the data-storage tracks further storing servo control data. In a preferred embodiment, the data-storage tracks further storing the servo-control data at a substantially same relative position on the data-storage tracks. In another preferred embodiment, the data-storage tracks further storing the servo-control data near edges of the data-storage card on the data-storage tracks. In another preferred embodiment, each of the data-storage track is substantially a semicircular arc-segment. In another preferred embodiment, each of the data-storage tracks includes several arc segments. In another preferred embodiment, the optical data-storage card further includes self-positioning guiding means for guiding the card to a loading position when inserted into a data card drive device. In another preferred embodiment, the optical data storage card having a first side and a second side and the data-storage tracks are disposed on the first and second sides. In another preferred embodiment, the optical data storage further includes a card jacket for storing the data storage card.

Furthermore, this invention provides a new method for storing data in an optical data-storage card. The method includes the steps of a) providing an optical data-storage medium layer supported on the data-storage card. And, b)forming in the data-storage medium layer a plurality of data storage tracks for storing data therein by forming each of the tracks to include at least an arc-segment and each of the data storage tracks substantially parallel to a neighboring track. In a preferred embodiment, the step of forming the data-storage tracks as arc segments is a step of forming each of the arc segments substantially of a same segment length. In another preferred embodiment, the method further includes a step of storing servo control data in the data-storage tracks. In another preferred embodiment, the step of storing the servo-control data is a step of storing the servo-control data at a substantially same relative position on the data-storage tracks. In another preferred embodiment, the step of storing the servo-control data is a step of storing the servo-control data near edges of the data-storage card on the data-storage tracks. In another preferred embodiment, the step of forming the data-storage to include at least an arc segment is a step of forming each of the data-storage tracks substantially as a semicircular arc-segment. In another preferred embodiment, the step of forming the data-storage to include at least an arc segment is a step of forming each of the data-storage tracks to include several arc segments. In another preferred embodiment, the method further includes a step of providing a self-positioning guiding means for guiding the optical data-storage card to a loading position when inserted into a data card drive device. In another preferred embodiment, the step of providing an optical data-storage medium layer supported on the card is a step of providing the optical data storage card to include a first side and a second side. And, the step of forming in the data-storage medium layer a plurality of data storage tracks is a step of forming the data-storage tracks on the first and second sides. In another preferred embodiment, the method further includes a step of providing a card jacket for storing the data storage card.

Figure 3A:
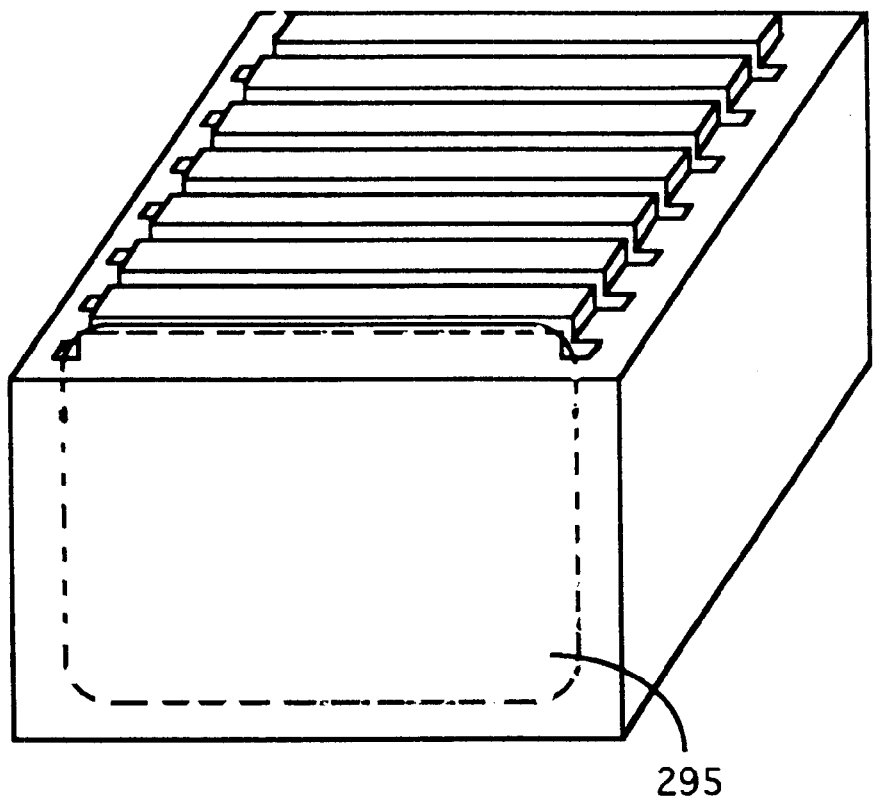
FIGS. 3A and 3B are a perspective view and a cross sectional view respectively of a data card storage box.
Figure 3B:
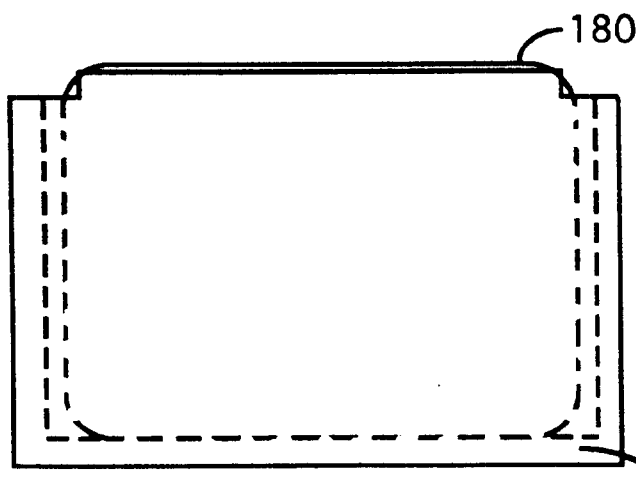

FIGS. 3A and 3B are a perspective view and a side view of a data card storage rack 295 for storing a plurality of data card 180 therein. The data card storage rack 295 as shown can be formed as partitioned storage box with each compartment ready to receive one data card 180. The data card storage rack 295 can function as a portable digital camera album or a backup data store for long term data storage.

Figure 4:
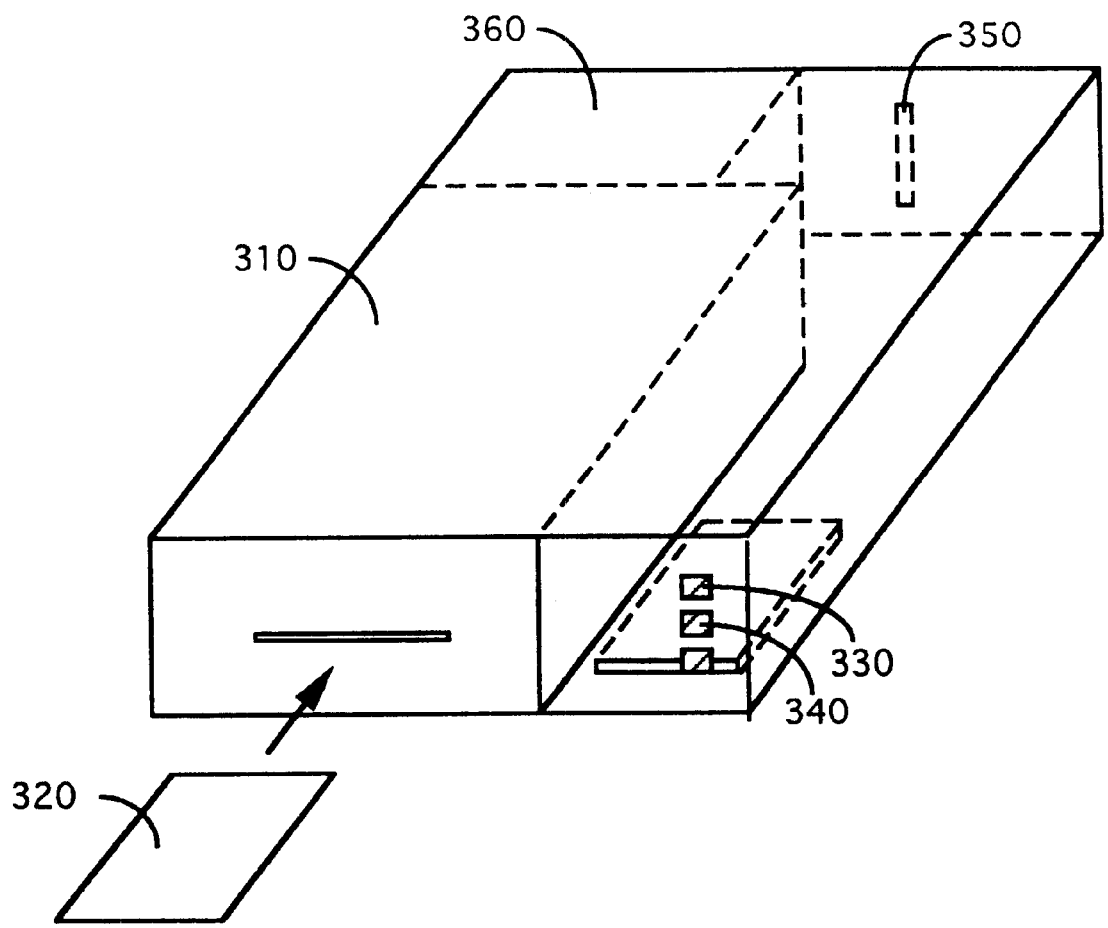
FIG. 4 is a functional block diagram of a subsystem of this invention includes a data card drive device of FIGS. 1A to 1C for reading/writing data storage card of FIGS. 2A to 2C.

FIG. 4 shows a subsystem 300 of this invention that includes a data card drive device 310 identical with the drive device 100 described above according to FIGS. 1A to 1C. The disk drive device 310 performs the data access tasks on a data storage card 320 identical to the data card 180 described above according to FIGS. 2A to 2C. The subsystem 300 further includes a local memory 330, which can be a DRAM or SRAM memory device connected to the disk drive device 310. The data stored in data card 320 can be first down loaded to the memory device 330 through a data bus for data storage. The subsystem 300 further includes a function control panel 340 to allow a user to control the subsystem startup, shutdown, save, update, and duplication of the data stored in the card. The subsystem 300 is further provided with a connection terminal 350 for connection to a personal computer, a printer, a scanner or other peripheral devices for operation together with the drive device subsystem 300. A power supply 360 is employed and connected to the subsystem 300 to provide power necessary for operating the drive device 310, the memory 340 and the control panel 330.

Therefore, the present invention discloses a data storage-card drive system with a pickup head moving above a data-storage card in rotational movement. The data read-write functions are enabled only for an arc segment, e.g., half-circle, or several arc segments of the rotational movement. The data tracks are arranged as plurality of parallel arcs, e.g., half-circles, or arc-segments with uniform data bit storage density. Specifically, a pickup head is provided, which is driven by a brushless motor to rotate over the data-storage card. The motor is mounted on a carriage for making horizontal movement along a longitudinal direction of the data card. The position of the pickup head is then servo-controlled moving the carriage and the brushless motor while the data storage card either stays at a fixed position or making only forward-backward movements. The difficulties and limitations encountered in the prior art due to a non-uniform data storage density among different data tracks are resolved by this invention. The technical difficulties caused by problems in loading/unloading of the pickup head to the recording medium, the transfer of read/write signal between the pickup head and the processing circuits, and the self centering of the data card in a data card drive device are also resolved by this invention. Furthermore, the difficulty of positioning and lifting horizontal rotating pickup head parallel to a flat recording surface at any intermediate stop location to convert the signal from the flat card to parallel rotating pickup head to process circuit Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

We claim:

1. An optical data-storage card comprising:
an optical data-storage media layer adhering on said card; and,
said data-storage media layer includes at least two data storage tracks comprising at least an arc-segment and a single full-circle data track for storing data therein and said data stored in said arc segment and said full-circle data track containing positioning data for controlling a position of a pickup head providing for rotating over said optical data-storage card.

2. The optical data storage card of claim 1 wherein:
said data-storage tracks include at least two arc-segments wherein one of said segments is a servo segment and another segment is a data segment wherein said servo segment stored servo data for servo-controlling said rotating pickup head providing for rotating over said optical data-storage card.

3. The optical data storage card of claim 1 wherein:
each of said data storage tracks comprising at least an arc servo-segment and an arc-data-segment wherein said servo segment stored servo data for servo-controlling said rotating pickup head provided for rotating over said optical data-storage card.

4. The optical data storage card of claim 3 wherein:
other than said single full-circle data track, each of said plurality of data storage tracks being substantially parallel to a neighboring track and having a substantially same data-storage density with said servo segments disposed on substantially same relative position on said data storage tracks for servo-controlling said rotating pickup head providing for rotating over said optical data-storage card.

5. The optical data storage card of claim 3 wherein:
each of said data storage tracks comprising a plurality of arc segments and each of said arc segments further having a servo-segment and a data segment wherein each of said arc segments having a substantially same data-storage density.

6. The optical data storage card of claim 1 wherein:
at least one of said data storage tracks comprising a circular arc segment and said circular arc segment further comprising a plurality of servo segments and data segments wherein said servo segment stored servo data for servo-controlling said rotating pickup head provided for rotating over said optical data-storage card.

7. The optical data storage card of claim 1 wherein:
said data storage tracks further comprising a plurality of circular arc segments each of said circular arc segments further comprising a plurality of servo segments and data segment wherein each of said arc segments having a substantially same data-storage density.

8. The optical data storage card of claim 5 wherein:
other than said single full-circle data track, each of said plurality of data storage track comprising a same number of arc segments each having a servo segment and a data segment.

9. The optical data storage card of claim 5 wherein:
other than said single full-circle data storage track, at least two of said data storage tracks comprising two different numbers of arc segments each having a servo segment and a data segment.

10. The optical data storage card of claim 3 wherein:

other than said single full-circle data storage track, said plurality of data storage tracks further comprising at least a first and a second parallel-data-storage-track sets with each of said data-storage tracks substantially parallel to a neighboring track in said first and said second parallel-data-storage-track sets, and said data storage tracks in said first parallel-data-storage-track set are not in parallel to said data storage tracks in said second parallel-data-storage-track set wherein each of said data-storage tracks having a substantially same data-storage density.

11. The optical data storage card of claim 10 wherein:

other than said single full-circle data storage track, at least one of said data storage tracks comprising at least two arc-segments each having a servo segment and a data segment wherein each of said arc-segments having a substantially same data-storage density.

12. The optical data storage card of claim 1 wherein further comprising:

said optical data-storage media layer further comprising at least two optical media layers for disposing said data storage tracks including at least an arc-segment and a single full-circle data track thereon having said positioning data for controlling a position of a pickup head provided for rotating over said optical data-storage card.

13. The optical data storage card of claim 1 wherein:

said optical data-storage media layer further comprising multiple substrate layers for disposing said data storage tracks including at least an arc-segment and a single full-circle data track thereon having said positioning data for controlling a position of a pickup head provided for rotating over said optical data-storage card.

14. The optical data storage card of claim 3 wherein:

other than said single full-circle data storage track, each of said data-storage tracks is substantially of a same track length each having said servo segment of substantially of a same servo segment length wherein each of said data-storage tracks having a substantially same data-storage density.

15. The optical data storage card of claim 3 wherein:

other than said single full-circle data storage track, at least two of said data-storage tracks are substantially of a different track lengths each containing different numbers of servo segments and data segments wherein each of said data-storage tracks having a substantially same data-storage density.

16. The optical data storage card of claim 5 wherein:

other than said single full-circle data storage track, each of said arc-segments having a substantially same segment length and each having a same number of servo segments and data segments.

17. The optical data storage card of claim 5 wherein:

other than said single full-circle data storage track, at least two of said arc-segments having two different segment lengths and each having a servo segment and a data segment of different lengths.

18. The optical data-storage card of claim 1 wherein:

said arc segment further storing servo control data stored in said servo segment for servo-controlling said rotating pickup head provided for rotating over said optical data-storage card.

19. The optical data storage card of claim 3 wherein:

other than said single full-circle data storage track, each of said data-storage tracks further storing servo-control data in said servo segment at a substantially same relative position on each of said data-storage tracks.

20. The optical data storage card of claim 18 wherein:

other than said single full-circle data storage track, each of said data-storage tracks further storing said servo-control data in said servo segment near edges of said data-storage card on each of said data-storage tracks.

21. The optical data storage card of claim 5 wherein:

other than said single full-circle data storage track, said data-storage tracks further storing servo-control data in at least two of said servo-segments.

22. The optical data storage card of claim 1 wherein:

said arc-segment is substantially a circular arc-segment of a fixed radius.

23. The optical data storage card of claim 1 wherein:

said arc segment is substantially a non-circular arc-segment.

24. The optical data storage card of claim 1 wherein:

said arc segment is substantially a semicircular arc-segment comprising said servo segment and said data segment.

25. The optical data storage card of claim 24 wherein:

said semicircular arc-segment extending over an arc angle less than one-hundred-and-eighty degrees.

26. The optical data storage card of claim 24 wherein:

said semicircular arc-segment extending over an arc angle greater than one-hundred-and-eighty degrees.

27. The optical data storage card of claim 1 wherein:

said arc segment is substantially an arc-segment with a radius less than a half-width of said data storage card.

28. The optical data storage card of claim 1 wherein:

said arc segment is substantially an arc-segment with a radius greater than a half-width of said data storage card.

29. The optical data storage card of claim 1 further comprising:

self-positioning guiding means for guiding said card to a loading position when inserted into a data card drive device provided with said optical pickup head rotating over said optical data-storage card.

30. The optical data storage card of claim 1 wherein:

said optical data storage card having a first side and a second side for disposing said optical-data storage media layer thereon; and said data-storage media layer on said first side and second side further includes at least two data storage tracks having at least an arc-segment and a single full-circle data track for storing data therein and said data stored in said arc segment and said full-circle data track containing positioning data for controlling a position of a first and a second pickup heads provided for rotating over said first side and second side of said optical data-storage card.

31. The optical data storage card of claim 1 further comprising:

a card jacket for storing said data storage card provided with said data storage tracks containing said arc-segment and said single full-circle data track.

32. The optical data storage card of claim 1 wherein:

said arc segment includes at least a servo segment and a data segment extending over an arc angle less than three-hundred-and-sixty degrees.

33. The optical data storage card of claim 1 wherein:

said arc segment includes at least two arc-segments each comprising a servo segment and a data segment extending over an arc angle less than three-hundred-and-sixty degrees.

34. The optical data storage card of claim 1 wherein:

said arc segment includes at least a servo segment for storing a servo data for servo-controlling said rotating pickup head provided for rotating over said optical data-storage card.

35. The optical data storage card of claim 34 wherein:

said servo data is written by a servo writer on said servo segment for servo-controlling said pickup head rotating over said data storage card.

36. The optical data storage card of claim 34 wherein:

said servo data is a changeable data by a servo writer on said servo segment.

37. The optical data storage card of claim 34 wherein:

said servo data is a readable data by said pickup head rotating over said data storage card.

38. The optical data storage card of claim 34 wherein:

said data storage track further storing data bits related to a system configuration provided with said pickup head rotating over said data storage card.

39. The optical data storage card of claim 38 wherein:

said system configuration can be changed by changing said data bits stored in said data storage tracks.

40. The optical data storage card of claim 38 wherein:

said system configuration can be retrieved by reading said data bits employing said pickup head rotating over said data storage card.

\* \* \* \* \*